United States Patent Office 3,432,533
Patented Mar. 11, 1969

3,432,533
PERFLUOROALKYL AND PERFLUOROACYL FERROCENES
Harold Rosenberg, Dayton, Ohio, assignor to the United States of America as represented by the Secretary of the Air Force
No Drawing. Filed Oct. 28, 1966, Ser. No. 591,058
U.S. Cl. 260—439
Int. Cl. C07f 15/02
6 Claims

ABSTRACT OF THE DISCLOSURE

The specification discloses novel (perfluoroalkyl)ferrocenes and (perfluoroacyl)ferrocenes which are useful as films and coatings and which are prepared by a modification of the Friedel-Crafts reaction.

---

The invention described herein may be manufactured and used by or for the United States Government for governmental purposes without payment to me of any royalty thereon.

This invention relates to fluorine-containing ferrocene compounds and particularly to aliphatic compounds such as (perfluoroacyl)ferrocenes (or perfluoroalkyl ferrocenyl ketones) and the (perfluoroalkyl)ferrocenes.

Since the discovery of bis(cyclopentadienyl)iron (or ferrocene) in 1951, many derivatives of this organometallic substance have been prepared and their properties studied. In an effort to make the unique radiation and oxidation resistance of the ferrocene available in a broad range of applications, particularly at high temperatures or upon exposure to high-dimensional stress, more recent attention has focused upon chemically incorporating the ferrocene moiety into various organic molecules and compounds wherein, their chemical integration notwithstanding, they will continue to impart their unique properties to the compounds which may themselves take the form of various additives, films, coatings, laminating components and the like.

Fluorine-containing ferrocene compounds characterized as (perfluoroaryl)ferrocenes and the synthesis thereof are also made known to the art by the concurrently filed and copending U.S. Patent application Ser. No. 576,783 by Harold Rosenberg for (Perfluoroaryl) Ferrocenes and the Synthesis Thereof. Prior to the inventions described in that copending application and set forth herein, however, no fluorine-containing ferrocene compounds were known to the art and there were no known methods for annexing a fluorine atom or a fluorine-containing radical to the ferrocene moiety in a stable and usable compound.

It is accordingly an object of the present invention to provide a new family of compositions of matter in the form of aliphatic fluorine-containing ferrocenes.

It is yet another object of the present invention to provide methods for the synthesis of such fluorine-containing ferrocenes.

Yet another object of the present invention is to provide for the synthesis of fluorine-containing ferrocene compounds in reasonably large yields.

To achieve these and other objects and advantages to be derived from incorporating a fluorine or fluorine-containing radical in a compound comprising a ferrocene moiety, the present invention teaches a modification of the Friedel-Crafts type reaction wherein a perfluorocarboxylic acid anhydride is employed in lieu of a perfluoroacyl halide that is frequently used in the adaptation of the Friedel-Crafts reaction. Thus, the reaction of ferrocene with the anhydride of a perfluorocarboxylic acid in the presence of a catalyst such as aluminum chloride in a conventional Friedel-Crafts reaction solvent, such as methylene chloride, ethylene chloride or carbon disulfide, results in yields on the order of from 30 to 40 percent of a (perfluoroacyl)ferrocene or perfluoroalkyl ferrocenyl ketone. This particular reaction may be characterized by the following equation:

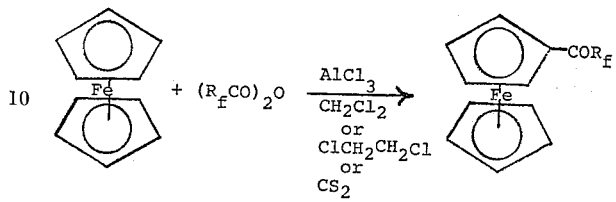

where $R_f$ is a perfluoroalkyl radical such as trifluoromethyl, pentafluoroethyl, heptafluoropropyl or another radical according to the formula $C_nF_{2n-1}$ where $n$ is an integer from one to seven. Substitution of a perfluoroacyl halide for the acid anhydride in the acylation reaction results, in general, in substantially lower ketone yields of as little as one percent and only as high as ten percent.

In a modification of the present invention wherein the perfluoroalkyl radical attaches directly to the ferrocene moiety without the intervention of the carbonyl radical such as results from the Friedel-Crafts type reaction, diferrocenylmercury and heptafluoropropyl iodide are reacted at elevated temperatures to produce the mon-substituted and 1,1'-disubstituted (perfluoropropyl)ferrocene.

The (perfluoroacyl)ferrocenes are either viscous oils or low-melting solids which are useful as oxidation-inhibiting and radiation-absorbing and protecting additives for fluids, greases, elastomers and other resinous compositions, particularly such as are to be exposed to high temperatures or to high radiation energy bombardment. Moreover, these perfluoroalkyl ferrocenyl ketones are useful as starting points or chemical intermediates for the development of other ferrocenyl compounds such as ferrocenyl-monocarboxylic acid or (1,1-dihydroperfluoroalkyl)ferrocene and (perfluoroalkyl)ferrocenes.

The general method for the acylation of ferrocene with perfluorocarboxylic acid anhydrides is illustrated by the synthesis of trifluoromethyl ferrocenyl ketone according to the following procedure. To a solution of 0.1 mole of ferrocene in 500 milliliters of anhydrous methylene chloride cooled to from 0 to 5 degrees centigrade is added 0.21 mole of granular anhydrous aluminum chloride. Trifluoroacetic anhydride in a 0.15 molar quantity is then added dropwise with stirring during the course of one and one-half hours while the temperature is maintained at below 5 degrees centigrade. The mixture is then stirred for an additional hour, allowed to warm to room temperature while being stirred overnight and poured slowly with rapid stirring into one liter of cold water. The resulting solution is treated with potassium sulfite (until the aqueous layer becomes pale green in color) to reduce the oxidized ferrocenes. The aqueous layer is then separated from the methylene chloride layer and washed with two 75-milliliter portions of methylene chloride, and the washings are then added to the main methylene chloride fraction. After filtration of the methylene chloride layer to remove any solid byproducts, the methylene chloride is removed by distillation in a vacuum. The residue is then taken up in a one-to-one benzene-petroleum ether solution at a temperature of from 30 to 60 degrees centigrade and filtered, and the filtrate is chromatographed on alumina. The column is first eluted with petroleum ether at from 30 to 60 degrees centigrade to remove the ferrocene and then with a one-to-one benzene-petroleum ether to yield, after evaporation of the solvent, 6.5 grams (31.5 percent based upon the recovered ferrocene) of the dark red trifluoromethyl ferrocenyl ketone [or (trifluoroacetyl)ferrocene], with a melting point of from 33 to 34 degrees centigrade, whose structure is confirmed by elemental and infrared spectral analysis.

By a similar acylation procedure employing pentafluoropropionic anhydride in lieu of the trifluoroacetic anhydride, pentafluoroethyl ferrocenyl ketone or (pentafluoropropionyl)ferrocene is obtained as a reddish brown oil with a freezing point of —20 degrees centigrade. The same general acylation method using perfluorobutyric anhydride gives the heptafluoropropyl analog, heptafluoropropyl ferrocenyl ketone or (heptafluorobutyryl)ferrocene, in a 36.1 percent yield or actually in 48.2 percent conversion (based upon the recovered ferrocene). This particular compound is a red paste having a softening point at —28 degrees centigrade.

As an example of the reaction of a ferrocenylmercury compound with a perfluoroalkyl halide to produce an organofluoro ferrocene derivative, diferrocenylmercury may be heated with heptafluoropropyl iodide in a sealed tube to obtain heptafluoropropyl and 1,1'-bis(heptafluoropropyl)ferrocene according to the following procedure. A mixture of .0017 mole of diferrocenylmercury and 15 milliliters of benzene is placed in a pyrolysis tube which is flushed with nitrogen. Then 0.014 mole of heptafluoropropyl iodide is added and the tube is sealed after first being cooled to 0 degrees centigrade. After the tube is heated to from 100 to 150 degrees centigrade for four to twenty hours, the contents are emptied into a distillation flask and the solvent is evaporated off. The dark solid residue is then removed by filtration and the red brown filtrate distilled in a vacuum to remove any benzene still present. The residue, consisting of liquid and solid materials, is then treated with an aqueous solution of sodium thiosulfate which is then extracted with ether. The ether extracts are washed with water, dried over anhydrous sodium sulfate and filtered. The material remaining after the removal of the ether is distilled at 100 degrees centigrade (under a vacuum of five millimeters of mercury) to yield a viscous orange material. This crude product is then redistilled at 50 degrees centigrade (under a vacuum of 0.2 millimeter of mercury) to yield a substance which, by infrared spectroscopy and elemental analysis, is indicated to be a mixture of heptafluoropropylferrocene and 1,1'-bis(heptafluoropropyl)ferrocene. The mixture may be separated by preparative vapor phase chromatography into the mono- and the disubstituted (perfluoroalkyl)ferrocenes.

While the invention has been described in detail in connection with certain specific examples and embodiments thereof, the foregoing particularization has been for the purpose of illustration only and does not limit the scope of the invention as it is defined in the subjoined claims.

I claim:
1. As new compositions of matter, that family of compounds comprising the (perfluoroalkyl)ferrocenes and (perfluoroacyl)ferrocenes having the general formulae:

$$(C_5H_5FeC_5H_4COC_nF_{2n-1})$$

$$(F_{2n-1}C_nCOC_5H_4FeC_5H_4COC_nF_{2n-1})$$

$$(C_5H_5FeC_5H_4C_nF_{2n-1})$$

and $$(F_{2n-1}C_nC_5H_4FeC_5H_4C_nF_{2n-1})$$

wherein $n$ is an integer of from one to seven.
2. (Perfluoropropyl)ferrocene.
3. 1,1'-(perfluoropropyl)ferrocene.
4. (Perfluoropropionyl)ferrocene.
5. (Perfluoroacetyl)ferrocene.
6. (Perfluorobutyryl)ferrocene.

References Cited

UNITED STATES PATENTS 2,875,223    2/1959    Pedersen et al. _____ 260—439

OTHER REFERENCES

Rosenblum: Chemistry of the Iron Group Metallocenes, Part 1, John Wiley & Sons (Interscience Publishers), New York, N.Y. (1965), pp. 62, 63, 66.

Rinehart et al.: J. Am. Chem. Soc. 85 (1963), pp. 970–2.

Nesmeyanov et al.: English Abstract of Doklady Akodemii Nauk SSSR, 1958, vol. 119, No. 2, pp. 288–91 (page 1 of abstract).

TOBIAS E. LEVOW, *Primary Examiner.*

A. P. DEMERS, *Assistant Examiner.*

U.S. Cl. X.R.

106—287; 252—49.7, 400, 478; 260—45.75